United States Patent Office
3,340,010
Patented Sept. 5, 1967

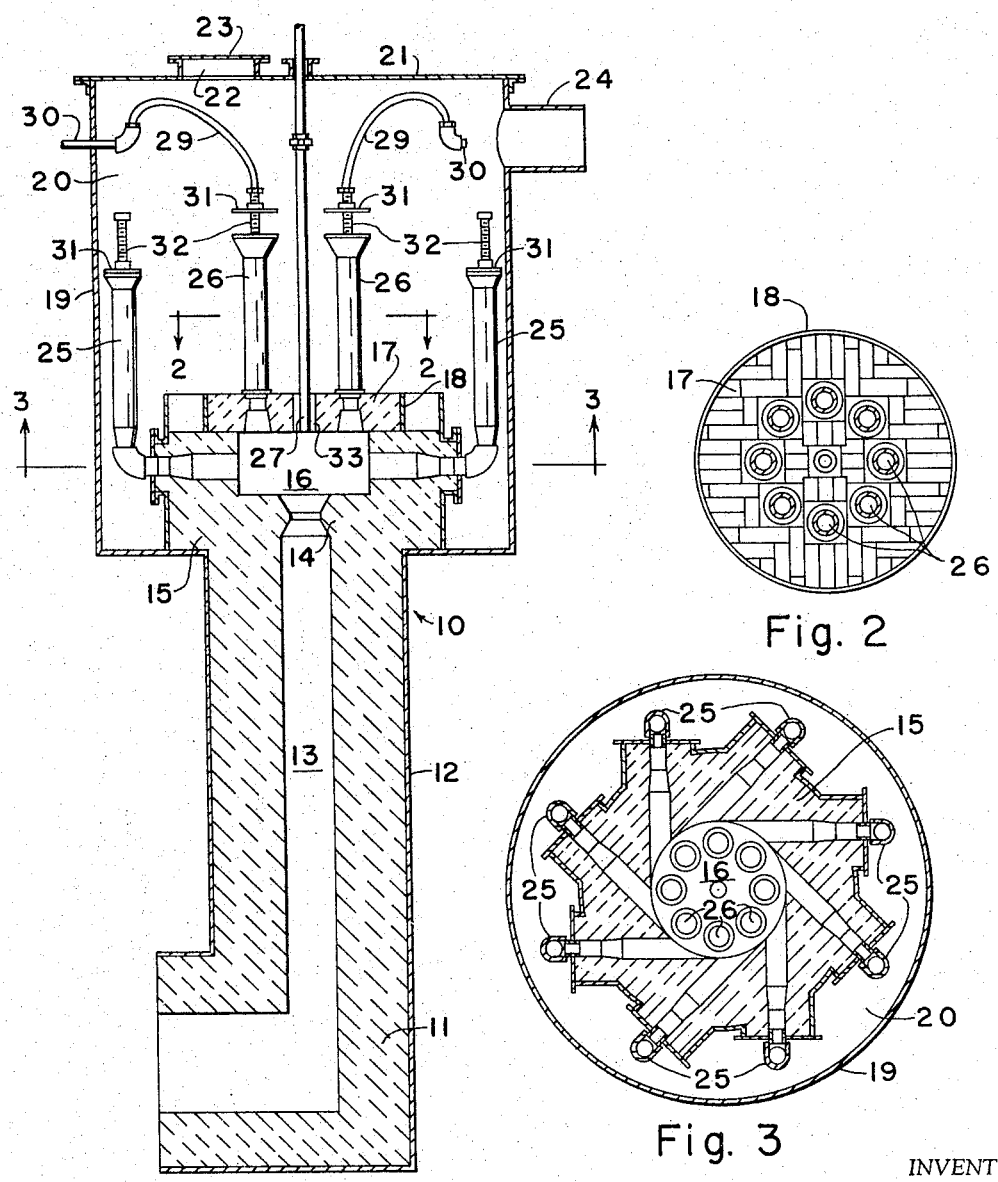

3,340,010
PROCESS AND APPARATUS FOR PRODUCING CARBON BLACK
Frank W. Selfridge, Borger, Tex., assignor to J. M. Huber Corporation, Locust, N.J., a corporation of New Jersey
Filed Sept. 26, 1963, Ser. No. 311,773
6 Claims. (Cl. 23—209.4)

ABSTRACT OF THE DISCLOSURE

A furnace and a method for producing carbon black whereby a particular furnace having a fixed combustion chamber and reaction chamber configuration is selectively controllable to produce any type and grade of carbon black within a broad range of types and grades, the invention requiring the regulation of the flow of combustion materials into the combustion chamber so as to produce different resultant flows determined by whether such flow occurs through vertical or horizontal burners or any combination thereof, each resultant flow corresponding to a different type or grade of carbon black being produced by the furnace.

---

The present invention relates to a process and an apparatus for producing carbon black of fine particle size by the thermal decomposition of hydrocarbons. More particularly, the invention is concerned with a process and apparatus for producing carbon black having closely controlled properties over a wide range of blacks.

Prior art furnaces such as those illustrated in Patents 2,625,466, 2,971,822, and 3,026,185 have been widely used to produce commercial grades of carbon black. These furnaces individually can be adjusted to produce blacks of similar properties through a fairly narrow range. They cannot, however, be used to produce blacks of dissimilar properties extending over a wide range without rebuilding the furnace. The number of grades of carbon black commercially produced are so numerous that it is often economically unfeasible to maintain a separate furnace for each grade. In fact, many companies do not manufacture all the commercial grades simply because the rebuilding of the furnaces to change grades is too costly.

The present invention has as its primary object the provision of a furnace and a process by means of which dissimilar grades of carbon black may be produced in a single furnace without expensive rebuilding.

Another object of the invention is to provide a carbon black furnace having a plurality of burners selectively operable to produce a plurality of carbon black grades.

A further object of the invention is to provide a carbon black furnace having a plurality of burners selectively operable to produce a plurality of new carbon black grades.

Other objects and advantages will become apparent in the following specification in which:

FIGURE 1 is a vertical sectional view of the invention;

FIGURE 2 is an enlarged, fragmentary, transverse section taken on line 2—2 of FIGURE 1 looking in the direction of the arrows; and FIGURE 3 is a fragmentary, transverse section taken on line 3—3 of FIGURE 1 looking in the direction of the arrows.

Referring now to the drawings in detail wherein like reference numerals indicate like parts throughout the several figures, the reference numeral 10 indicates generally a carbon black furnace constructed in accordance with the invention.

The carbon black furnace 10 includes an elongated, upright, massive, refractory cylinder 11 supported in a steel shell 12. The cylinder 11 is provided with an axial cylindrical reaction chamber 13 having a throat 14 formed in its upper end.

The cylinder 11 is enlarged at its upper end to form a body 15 having a combustion chamber 16 formed therein communicating with the reaction chamber 13 through the throat 14. A head 17 formed of refractory material and enclosed by a steel shell 18 is removably supported on the body 15 and forms a closure for the upper end of the combustion chamber 16.

A steel housing 19 extends from below the body 15 to a point well above the head 17, forming a plenum 20 completely surrounding the body 15 and the head 17. A cover 21 is secured to the top of the housing 19 and is, in turn, provided with an access port 22 closed by a removable lid 23. A conduit 24 extends from the housing 19 to a source of air under pressure (not shown) to maintain an air supply in the plenum 20.

A plurality of horizontal inspirating gas burners 25 extend through the body 15 opening into the combustion chamber 16 tangentially thereof as can be clearly seen in FIGURE 3. While not limited thereto, eight burners 25 have been found to be quite effective in practicing the present invention.

A plurality of vertically disposed inspirating gas burners 26 are mounted to extend through the head 17 opening into the combustion chamber 16. The vertical burners 26 are arranged in a circle equally spaced from the center of the combustion chamber 16. While not limited thereto, eight burners 26 have been found to be quite effective in practicing the invention.

A liquid hydrocarbon feedstock nozzle 27 is axially mounted in the head 17 and has a pipe 28 extending therefrom to a source of supply (not shown).

Each of the burners 26 is illustrated as connected to a flexible gas line 29, in turn, connected to a gas pipe 30. The flexible gas lines 29 are detachably connected to the burners 26 and may also be connected to the burners 25 as desired.

The burners 25 and 26 each have an air inlet cover plate 31 which is mounted on a threaded tube 32 so that it can be fully opened as shown on the burners 26 or fully closed as shown on the burners 25. Obviously, the cover plates 31 may be adjusted to any intermediate position desired. When a burner 25 or 26 is in use, its respective air inlet cover plate 31 will be open to permit air from the plenum 20 to flow therethrough; when the burner 25 or 26 is not in use, its respective cover plate 31 is closed to prevent air from flowing into the combustion chamber 16 through the unused burner 25 or 26. The nozzle 27 passes through an opening 33 in the head 17 somewhat larger than the nozzle 27 and air from the plenum 20 flows through the opening 33 maintaining the nozzle 27 cool.

The actual conversion of the furnace 10 from one type of burner arrangement to another can be completed including the time required to come back up to operating temperature in less than 2 hours. When converting the furnace 10 from one burner arrangement to another, all operating burners except one to serve as a pilot are shut down and the air inlet cover plates 31 of these burners are closed. The air inlet cover plates 31 of the burners to be used are opened and gas is then fed to these burners which ignite from the pilot burner. The pilot burner is then shut down and its cover plate 31 is closed. The lid 23 of the plenum 20 is then closed and the furnace 10 is quickly brought up to operating temperature.

It should be understood that the gas supply to the burners 25 and 26 may be individually regulated by valves so that any number and combination of the burners 25 and 26 may be used as desired. It should also be understood that the burners 25 and 26 may be oil burners when such use is economical.

While a vertical arrangement has been shown for the furnace 10, it should be understood that it may also be arranged with its axis in any desired relation to vertical.

Grades of carbon black produced commercially at the present time include thermal blacks, oil SRF, oil/gas SRF, HMF, HAF, ISAF, SAF, low modulus ISAF, FEF, GPF, super high modulus HSF, super high modulus ISAF and super high modulus SAF. With prior art furnaces, thermal blacks require one type of furnace while oil/gas SRF in two grades and one grade of HMF are produced on a second type furnace. A third type of furnace is used for producing HAF while a fourth can be used for ISAF, low modulus ISAF and SAF. With a fifth type of furnace, FEF, GPF, and oil SRF can be produced.

With the furnace of the instant invention HAF, ISAF, low modulus ISAF, low modulus HAF, SAF, super high modulus HAF, super high modulus ISAF, and super high modulus SAF may all be produced without rebuilding the furnace.

The following examples illustrate typical methods of producing carbon black using the furnace of the instant invention.

*Example I*

A furnace of the design illustrated in FIGURES 1 through 3 was operated with all eight of the burners 26 in use and all eight of the burners 25 at rest.

Natural gas of 1000 B.t.u. per cubic foot was supplied through the burners 26 at the rate of 192 cubic feet per minute and was burned with 2558 cubic feet of air per minute. A residual oil having an API gravity of about 3 was preheated to 650° F. and fed under pressure through feedstock nozzle 27 at the rate of 3.2 gallons per minute along with 55 cubic feet per minute of atomizing gas. The atomizing gas is natural gas.

The decomposition products formed in the reaction chamber 13 were cooled to 1210° F. by a water spray at the exit end of the furnace in the normal manner.

The carbon black was finally collected by conventional apparatus and is classified as a regular HAF.

*Example II*

A furnace of the design illustrated in FIGURES 1 through 3 was set up so that four of the burners 25 in radially equispaced relation and four of the burners 26 also in radially equispaced relation are arranged to operate while the remaining burners 25 and 26 are at rest.

Natural gas of 1000 B.t.u. per cubic foot was supplied through the burners 25 and 26 at the rate of 216 cubic feet per minute and was burned with 2600 cubic feet of air per minute. A residual oil having an API gravity of about 3 was preheated to 650° F. and fed under pressure through the feedstock nozzle 27 at the rate of 3.67 gallons per minute along with 15 cubic feet per minute of atomizing gas. The atomizing gas is natural gas. The decomposition products formed in the reaction chamber 13 were cooled to 1210° F. by a water spray at the exit end of the furnace in the normal manner.

The carbon black was finally collected by conventional apparatus and was classified as a high structure HAF.

*Example III*

A furnace of the design illustrated in FIGURES 1 through 3 was operated with all eight of the burners 25 in use and all eight of the burners 26 at rest.

Natural gas of 1000 B.t.u. per cubic foot was supplied through the burners 25 at the rate of 223 cubic feet per minute and was burned with 2950 cubic feet of air per minute. A residual oil having an API gravity of about 3 was preheated to 650° F. and fed under pressure through feedstock nozzle 27 at the rate of 3.4 gallons per minute along with 60 cubic feet per minute of steam under 85 pounds pressure per square inch to atomize the oil.

The decomposition products formed in the reaction chamber 13 were cooled to 1210° F. by a water spray at the exit end of the furnace in the normal manner.

The carbon black was finally collected by conventional apparatus and was classified as a regular ISAF.

The product of Example I is an HAF carbon black with properties as shown in Table I. The product of Example II is a high structure HAF carbon black with properties as shown in Table I. The product of Example III is an ISAF carbon black with properties as shown in Table I.

TABLE I

| Black | Iodine No., Mgs. Iodine Per Gram of Black | Oil Absorption in Gms. Per 100 Gms. |
| --- | --- | --- |
| From Example I | 74 | 94. |
| From Example II | 83 | 264. |
| From Example III | 114 | 110. |
| Normal HAF | From 73 to 85 | From 110 to 125. |
| Normal ISAF | From 110 to 125 | From 120 to 140. |

The blacks produced in Examples I and III are equivalent to conventional blacks of the respective types while the black of Example II was an unusually high structure black. The black of Example II produced when used in conventional rubber recipes an unusually high modulus of elasticity further confirming the presence of high structure in the black.

Having thus described the preferred embodiments of the invention it should be understood that numerous modifications and adaptations may be resorted to without departing from the scope of the appended claims.

I claim:

1. A carbon black furnace for producing any type and grade of carbon black within a wide range of types and grades without having to alter the furnace refractory parts so as to provide a different combustion chamber or reaction chamber configuration for each desired type and grade of carbon black, comprising: an elongated refractory cylinder having a reaction chamber extending axially therethrough, a refractory cylindrical body formed on one end of said cylinder and having a combustion chamber axially arranged therein communicating with said reaction chamber, said combustion chamber having the end thereof opposite said reaction chamber open, a refractory head engaging the open end of said cylindrical head closing said combustion chamber, a plurality of burners extending horizontally through said body and opening tangentially into said combustion chamber, a plurality of burners extending vertically through said head into said combustion chamber, an air supply plenum encompassing said body, said head, and all of said burners for supplying air to said burners when in operation, a feedstock nozzle extending through said head for delivering feedstock into said combustion chamber, means for selectively controlling the flow of fuel and air through each individual horizontal and vertical burner whereby the fuel and air flow can be regulated to flow into said combustion chamber through any of the horizontal and vertical burners or any combination thereof.

2. A carbon black furnace for producing any type and grade of carbon black within a wide range of types and grades without having to alter the furnace refractory parts so as to provide a different combustion chamber or reaction chamber configuration for each desired type and grade of carbon black, comprising: an elongated refractory cylinder having a reaction chamber extending axially therethrough, a refractory cylindrical body formed on one end of said cylinder and having a combustion chamber axially arranged therein communicating with said reaction chamber, said combustion chamber having the end thereof opposite said reaction chamber open, a refractory head engaging the open end of said cylindrical head closing said combustion chamber, a plurality of burners extending horizontally through said body and opening tangentially into said combustion chamber, a plurality of burners extending vertically through said head into said combustion chamber, an air supply plenum encompassing said body, said head, and all of said burners for supplying air to said burners when in operation, a feedstock nozzle extending through said head for delivering feedstock into said combustion chamber, means for selectively controlling the flow of fuel and air through each individual horizontal and vertical burner whereby the fuel and air flow can be regulated to flow into said combustion chamber through any of the horizontal and vertical burners or any combination thereof, said last mentioned means comprising closure means on each burner for selectively closing any burner against passage of air and fuel therethrough when not in operation.

3. A furnace as set forth in claim 2 wherein said closure means includes an externally threaded hollow shaft on said burner and a damper plate mounted for adjustment on the threaded shaft.

4. A carbon black producing process employing a carbon black furnace which includes a cylindrical combustion chamber having a set of radially equispaced burners opening tangentially into the combustion chamber in a plane perpendicular to the axis of the combustion chamber, a set of radially equispaced burners opening into the combustion chamber on a circle concentric to the axis of said combustion chamber, and a feedstock delivery nozzle opening into the combustion chamber axially thereof, which comprises injecting into the combustion chamber from at least one burner from both sets of burners and burning in the combustion chamber a combustible mixture of a hydrocarbon fuel and an oxygen containing gas in a proportion of from 90% to 125% of that required for complete combustion of the hydrocarbon fuel, simultaneously injecting through the nozzle into the combustion chamber a hydrocarbon feedstock, decomposing the feedstock predominantly within the combustion chamber flowing the resulting carbon and reaction gases out of the combustion chamber, and quenching the outflow promptly after its emergence from the combustion chamber whereby carbon of extremely fine particle size is obtained.

5. A carbon black producing process employing a carbon black furnace which includes a cylindrical combustion chamber having a set of radially equispaced burners opening tangentially into the combustion chamber in a plane perpendicular to the axis of the combustion chamber, a set of radially equispaced burners opening into the combustion chamber on a circle concentric to the axis of said combustion chamber, and a feedstock delivery nozzle opening into the combustion chamber axially thereof, which comprises injecting into the combustion chamber from an equal number of burners from both sets of burners and burning in the combustion chamber a combustible mixture of a hydrocarbon fuel and an oxygen containing gas in a proportion of from 90% to 125% of that required for complete combustion of the hydrocarbon fuel, simultaneously injecting through the nozzle into the combustion chamber a hydrocarbon feedstock, decomposing the feedstock predominantly within the combustion chamber flowing the resulting carbon and reaction gases out of the combustion chamber, and quenching the outflow promptly after its emergence from the combustion chamber whereby carbon of extremely fine particle size is obtained.

6. A carbon black producing process employing a carbon black furnace which includes a cylindrical combustion chamber having a set of radially equispaced burners opening tangentially into the combustion chamber in a plane perpendicular to the axis of the combustion chamber, a set of radially equispaced burners opening into the combustion chamber on a circle concentric to the axis of said combustion chamber, and a feedstock delivery nozzle opening into the combustion chamber axially thereof, which comprises injecting into the combustion chamber from burners in both sets of burners and burning in the combustion chamber a combustible mixture of a hydrocarbon fuel and an oxygen containing gas in a proportion of from 90% to 125% of that required for complete combustion of the hydrocarbon fuel, simultaneously injecting through the nozzle into the combustion chamber a hydrocarbon feedstock, decomposing the feedstock predominantly within the combustion chamber flowing the resulting carbon and reaction gases out of the combustion chamber, and quenching the outflow promptly after its emergence from the combustion chamber whereby carbon of extremely fine particle size is obtained.

References Cited

UNITED STATES PATENTS

| | | | |
|---|---|---|---|
| 2,971,822 | 2/1961 | Williams | 23—209.4 |
| 3,026,185 | 3/1962 | Takewell et al. | 23—209.4 X |
| 3,071,443 | 1/1963 | Bellew | 23—209.4 |

OSCAR R. VERTIZ, *Primary Examiner.*

EDWARD J. MEROS, *Assistant Examiner.*